Figure 1:
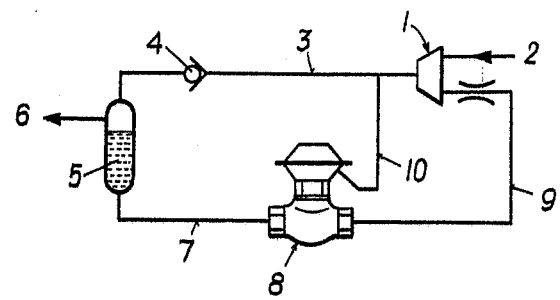

United States Patent [19]

Bauer

[11] 4,098,487
[45] Jul. 4, 1978

[54] DEVICE FOR CONTROLLING OIL INJECTION TO A SCREW COMPRESSOR

[75] Inventor: Friedrich Bauer, Vienna, Austria

[73] Assignee: Hoerbiger Ventilwerke Aktiengesellschaft, Vienna, Austria

[21] Appl. No.: 773,676

[22] Filed: Mar. 2, 1977

[30] Foreign Application Priority Data

Mar. 3, 1976 [AT] Austria .................................. 1578/76

[51] Int. Cl.² .......................................... F16K 31/365
[52] U.S. Cl. .................... 251/61.4; 251/61.2
[58] Field of Search ............... 251/61.4, 25, 50, 61.2, 251/61.5, 12, 47; 137/505.28

[56] References Cited

U.S. PATENT DOCUMENTS

| 2,811,167 | 10/1957 | Bott | 251/61.5 X |
| 3,556,463 | 1/1971 | Williams | 251/25 X |
| 3,874,629 | 4/1975 | Fontaine | 251/61.4 |

FOREIGN PATENT DOCUMENTS

| 78,948 | 8/1962 | France | 251/61.4 |
| 1,153,521 | 3/1958 | France | 251/61.2 |

Primary Examiner—Arnold Rosenthal
Attorney, Agent, or Firm—Watson, Cole, Grindle & Watson

[57] ABSTRACT

A device for controlling oil injection to a screw compressor, the device comprising an oil stop valve having a closing element mounted at one end of a valve stem slidably and sealingly received in a bore connecting the valve with a housing divided by a diaphragm mounted on the other end of the valve stem into two chambers, one chamber being connectable to the compressor output and when pressurized, serving to act on the diaphragm to open the valve, and the other chamber communicating with the valve via an axial bore in the valve stem and when pressurized, serving to act on the diaphragm to close the valve, the valve stem in its portion received in the bore having a cross-sectional area approximately equal to the effective sealing surface area of the closing element.

3 Claims, 2 Drawing Figures

DEVICE FOR CONTROLLING OIL INJECTION TO A SCREW COMPRESSOR

This invention relates to a device for controlling oil injection to a screw compressor, the device having an oil stop valve for installation in an oil injection duct of the compressor, a closing element of the valve being controlled by a valve stem and a diaphragm acting on the stem in dependence on the output pressure of the screw compressor.

In order to improve sealing and also lubrication of screw compressors, oil is often injected during operation, usually by means of injection nozzles. Oil injection must be carried out accurately if excessive oiling or damage to the compressor due to insufficient lubrication are to be avoided. After stopping of the compressor, the oil supply to the injection nozzles must be quickly and safely interrupted, whereas during starting, rapid reopening of the supply is required.

Known devices for controlling oil injection make use of an oil stop valve whose closing element is urged by a closing spring so that in the inoperative de-pressurised position of the compressor apparatus, the oil stop valve is closed. As soon as the compressor is restarted and feed pressure is built up, the control diaphragm of the oil stop valve is operated and the valve is opened. When the opening pressure decreases as soon as the compressor is stopped, the oil stop valve closes the injection duct under the action of its closing spring. This form of control has been found in practice to be satisfactory, but in many cases it is necessary that the oil stop valve is reopened immediately after de-pressurising of the compressor so that upon restarting of the compressor lubrication may start immediately. Up to now, this requirement could be met only by using oil stop valves having two inlets for the connection of control ducts on both sides of the diaphragm. This has the disadvantage of involving comparatively high costs since for each required kind of control another connection for the oil stop valve must be adopted.

An object of the invention is to provide a control device having an oil stop valve of simple construction by means of which the two above mentioned requirements can optionally be met without the necessity for additional apparatus or component parts.

According to the present invention, there is provided a device for controlling oil injection to a screw compressor, the device comprising an oil stop valve having a closing element mounted at one end of a valve stem slidably and sealingly received in a bore connecting the valve with a housing divided by a diaphragm mounted on the other end of the valve stem into two chambers, one chamber being connectable to the compressor output and serving when pressurised to act on the diaphragm to open the valve, and the other chamber communicating with the valve via an axial bore in the valve stem and serving when pressurised to act on the diaphragm to close the valve, the valve stem in its portion received in the bore having a cross-sectional area approximately equal to the effective sealing surface area of the closing element.

The oil stop valve is thus controlled by this arrangement in dependence of the supply pressure of the screw compressor. This pressure acts on an opening pressure chamber of the diaphragm and ensures that during the operation of the compressor the oil stop valve is always open. As soon as the supply stops, the pressure in the opening pressure chamber of the diaphragm rapidly drops. The pressure of the oil under pressure controlled by the oil stop valve decreases, however, more slowly. Since the same pressure also exists along the longitudinal duct in the valve stem as well as in the closing pressure chamber of the diaphragm, as soon as the screw compressor stops, the oil stop valve is closed. The equality of the cross-sectional area of the valve stem and the effective sealing surface area of the closing element ensures a sensitive actuation of the closing element by means of small forces. By means of proportionally small closing and opening forces acting on the closing element, it is possible to arrange that the oil stop valve is either closed or opened in a pressureless condition. Advantageously, springs are used for this purpose.

If according to a further feature of the invention, both diaphragm chambers are constructed for optional installation in them of a pressure spring urging the diaphragm, it is sufficient to install the pressure spring available either in the opening pressure chamber or in the closing pressure chamber in order to maintain the oil stop valve either open or closed should the compressor arrangement become pressureless. In this way, given requirements and demands are met in practice without the need to change apparatuses or other essential components of the control apparatus.

Figure 2:
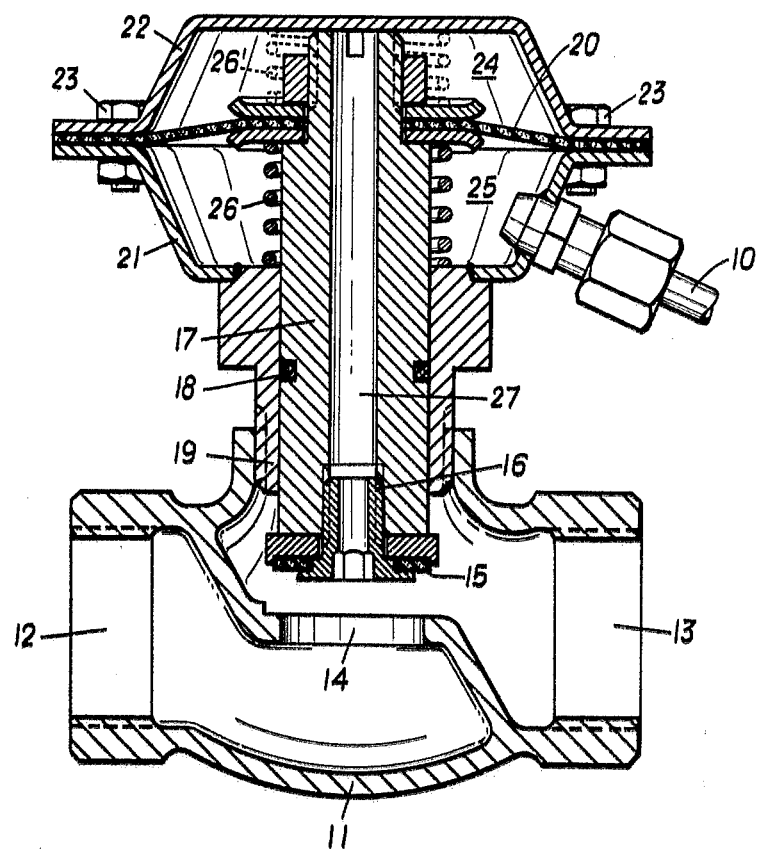

Further features and advantages of the invention will appear from the following description of an embodiment with reference to the drawings, in which:

FIG. 1 is a diagram of a compressor installation having a control device according to the invention, and FIG. 2 shows an axial cross-sectional view of the control device.

The compressor installation shown in FIG. 1 comprises a screw compressor 1 having an intake duct 2 and an output duct 3. The output duct 3 includes a check valve 4 and an oil separator 5 having a delivery conduit 6. An oil conduit 7 opens into an oil stop valve 8 which communicates with the screw compressor 1 by way of an injection conduit 9. Finally, a control conduit 10 branches off the delivery duct 3 before the check valve 4 and opens into a control chamber of the oil stop valve 8.

The oil stop valve 8 shown in FIG. 2 comprises a valve body 11 having an inlet 12 and an outlet 13 which are separated from each other by a partition wall in which a valve opening 14 is formed. A closing element 15 cooperates with the opening 14, the element 15 being fixed to the lower end of a valve stem 17 by means of a screw 16. The valve stem 17 is guided in the body 11 by means of bushing 19 with the interposition of an O-ring 18, and is connected at its upper end to a diaphragm 20. A casing 21 is attached to the bushing 19 and is closed by a lid or cap 22. Screws 23 clamp the outer edge of the diaphragm 20 which divided the space between the case 21 and the cap 22 into an upper closing pressure chamber 24 and a lower opening pressure chamber 25. The control conduit 10 from the delivery duct 3 opens into the opening pressure chamber 25. Moreover, a pressure spring 26 is disposed in the opening pressure chamber 25 and urges the closing element 15 in the opening direction of the valve. Optionally, instead of the prssure spring 26, a pressure spring 26' can be disposed in the closing pressure chamber 24 as indicated by dashed lines in FIG. 2. The valve stem 17 is formed with a longitudinal duct 27 which extends from the region of the sealing surface of the closing element 15 to the closing pressure chamber 24.

When the screw compressor 1 is started, the pressure in the output duct 3 increases. The pressure is transmitted to, and acts on, the diaphragm 20 in the opening pressure chamber 25 via the control conduit 10 so that the closing element 15 is moved away from the valve opening 14, and thus the oil stop valve 8 is opened, as shown in FIG. 2. At the same time, pressure is built up in the oil separator 5 through the check valve 4 so that oil is supplied via the oil conduit 7 to the oil stop valve 8 and from this to the screw compressor 1 via the injection conduit 9. When the screw compressor 1 is stopped, the pressure drops rapidly in the delivery duct 3 and thus in the opening pressure chamber 25 of the oil stop valve 8. On the other hand, the pressure in the oil separator is maintained for a longer time. Since this pressure is transmitted through the longitudinal duct 27 in the valve stem 17 to the closing pressure chamber 24 where it acts on the diaphragm 20 in the closing direction, the diaphragm 20 together with the valve stem 17 and closing element 15 will move downwards and the oil stop valve will be closed. Consequently, oil injection into the screw compressor 1 will be interrupted, thereby preventing overlubrication.

At this point, the pressure spring 26 in the opening pressure chamber 25 acts so that the closing element 15 is moved away again from the valve seat opening 14 and the oil stop valve 8 is thus opened as soon as the compressor installation including the oil separator 5 becomes depressurised. In this way, it is ensured that upon restarting of the screw compressor 1 the oil stop valve 8 is opened and thus oil injection can take place.

As previously mentioned, the spring 26 in the opening pressure chamber 25 can be replaced by a spring 26' in the closing pressure chamber 24 as shown in FIG. 2 by dashed lines. The spring 26' acts then in the closing direction on the closing element 15 so that, should the compressor installation becomes depressurised, the oil stop valve remains closed. However, as soon as the screw compressor 1 is restarted and pressure is built up in the output duct 3, the oil stop valve will be immediately opened because the increasing pressure is transmitted to the opening pressure chamber 25 through the control conduit 10, and is thus applied to the diaphragm 20 which causes the closing element 15 to move away from the valve seat opening 14, overcoming the force of the spring 26'.

An important condition for optimum operation of the oil stop valve is for displacement of the closing element 15 and the valve stem 17 to occur under relatively small forces. This is achieved in that the cross-section of the valve stem 17 in the region of the O-ring 18 is as large as the effective sealing surface of the closing element 15, which, in the embodiment shown in FIG. 2, is also the same as the area of the valve seat opening 14. The valve stem 17 together with the locking piece 15 can then be disposed independently of any oil pressure at the inlet 12 and the outlet 13 of the oil stop valve 8 by means of a relatively small local force.

I claim:

1. A device adapted for controlling oil injection to a screw compressor, the device comprising a housing divided by a diaphragm into two chambers, a stop valve including a valve stem having an axial bore and a closing element mounted at one end of the valve stem, the diaphragm mounted on the other end of the valve stem, and a bore between the closing element of the valve and the housing, the valve stem slidably and sealingly received in the bore, one chamber of the housing being adapted to be connected to the output of the compressor and serving when pressurised to act on the diaphragm to open the valve, and the other chamber communicating with the valve via the axial bore in the valve stem and serving when pressurised to act on the diaphragm to close the valve, the valve stem in its portion received in the bore having a cross-sectional area approximately equal to the effective sealing surface area of the closing element of the valve.

2. A device according to claim 1, wherein the two chambers are adapted for alternative installation in either chamber of a compression spring acting on the diaphragm.

3. A device according to claim 1, wherein said one chamber is arranged between said other chamber and said bore, and said other chamber communicates with the inlet side of the oil stop valve when the valve is closed.

* * * * *